(12) United States Patent
Tung et al.

(10) Patent No.: US 9,538,051 B2
(45) Date of Patent: Jan. 3, 2017

(54) DEVICE AND METHOD FOR USING AN OVERDRIVE FUNCTION TO DO MOTION SMOOTHING

(71) Applicant: Realtek Semiconductor Corp., Hsinchu (TW)

(72) Inventors: Hsu-Jung Tung, Chu Pei (TW); Chun-Hsing Hsieh, Hsin Chu (TW); Chung-Ping Yu, Tai Pei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 14/606,673

(22) Filed: Jan. 27, 2015

(65) Prior Publication Data
US 2015/0215498 A1      Jul. 30, 2015

(30) Foreign Application Priority Data

Jan. 28, 2014  (TW) .............................. 103103109 A

(51) Int. Cl.
| | |
|---|---|
| H04N 5/21 | (2006.01) |
| G09G 5/36 | (2006.01) |
| H04N 7/50 | (2006.01) |
| H04N 5/14 | (2006.01) |
| H04N 7/01 | (2006.01) |

(52) U.S. Cl.
CPC ................ H04N 5/21 (2013.01); G09G 5/363 (2013.01); G09G 2320/0252 (2013.01); G09G 2320/10 (2013.01); H04N 5/145 (2013.01); H04N 7/0115 (2013.01)

(58) Field of Classification Search
CPC ............ H04N 5/21; H04N 5/145; H04N 9/87; H04N 7/0115; H04N 7/50; G09G 5/00
USPC .......................................... 386/353; 375/240
See application file for complete search history.

(56) References Cited

U.S. PATENT DOCUMENTS

| | | | |
|---|---|---|---|
| 7,734,108 B2 | 6/2010 | Oura | |
| 2005/0225522 A1* | 10/2005 | Wu | ....................... G09G 3/3648 345/87 |
| 2008/0106544 A1* | 5/2008 | Lee | ....................... G09G 3/3611 345/214 |

* cited by examiner

Primary Examiner — Thai Tran
Assistant Examiner — Nien-Ru Yang
(74) Attorney, Agent, or Firm — Muncy, Geissler, Olds & Lowe, P.C.

(57) ABSTRACT

A device and method using an overdrive function to do smoothing processing of video data including a frame sequence AABB or AABBB is disclosed in the present invention. The device includes a video information generator and an over drive circuit. The video information generator detects a plurality of continuous frames wherein the continuous frames include a current frame and a previous frame. When a second value of the current frame is different from a first value of the previous frame having the same position as that of the second value, the video information generator generates first video information; When the second value of the current frame is the same as the first value of the previous frame having the same position as that of the second value, the video information generator generates second video information. The over drive circuit generates a first target value which is a value between the first value and the second value according to the first video information, and uses the first target value to replace the second value of the current frame; or the overdrive circuit generates a second target value according to the second video information, and uses the second target value to replace the second value of the current frame.

11 Claims, 12 Drawing Sheets

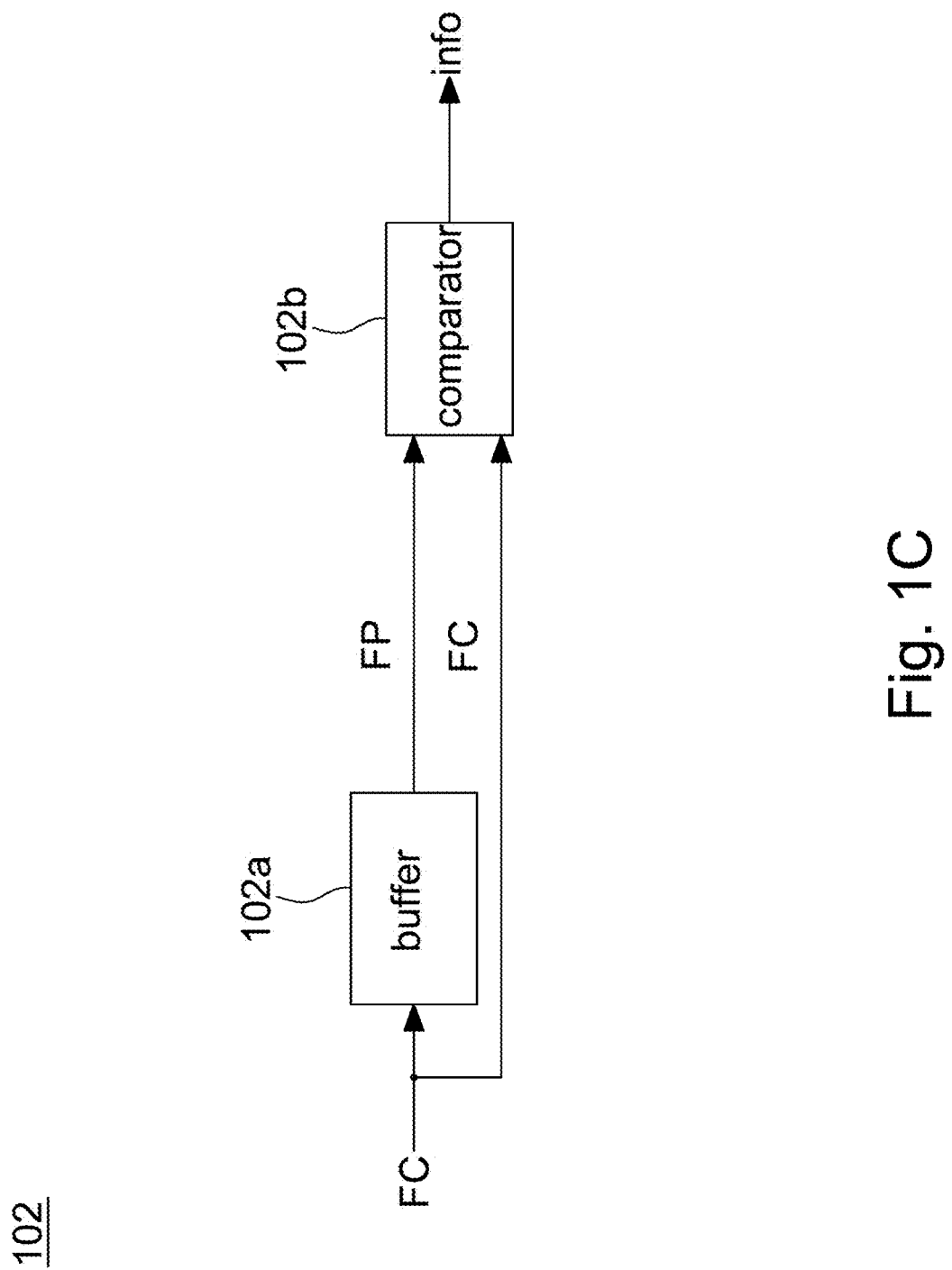

DEVICE AND METHOD FOR USING AN OVERDRIVE FUNCTION TO DO MOTION SMOOTHING

This application claims the benefit of the filing date of Taiwan Application Ser. No. TW103103109, filed on Jan. 28, 2014, the content of which is incorporated herein by reference.

BACKGROUND OF THE INVENTION

Field of the Invention

The invention relates to a video processing device and method, and more particularly, to a device and method using an overdrive function to do smoothing processing of video data.

Description of the Related Art

In conventional video playing techniques, inputting a video, for example having repeated frames 22 (AABB) or 23 (AABBB) often has juddering or unsmooth problems during playing. Therefore, video processing, such as motion estimation (ME), motion compensation (MC), is required to have smoother playing effect. Such a process is usually called "de-judder".

However, generally a de-juddering method requires a large amount of resources and high production cost. Thus, how to provide a de-juddering method for smoothing video data is an urgent problem to be overcome.

SUMMARY OF THE INVENTION

On objective of the present invention is to provide a device for smoothing video data by using an over drive circuit to adjust video values to achieve the purpose of smoothing video data.

According to one embodiment of the present invention, a device using an overdrive function to do smoothing processing of video data including a frame sequence AABB or AABBB is provided. The device includes a video information generator and an over drive circuit. The video information generator detects a plurality of continuous frames from the video data. Please note that in an embodiment, the video information generator may further detect the order of a received frame in the frame sequence, detect if a received frame is a frame A or a frame B, . . . and/or other information so as to generate the video information info which further includes an order information, content information of a frame (such as frame A or frame B) and/or other information.

When a second value of a current frame in the continuous frames is different from a first value of a previous frame in the continuous frames having the same position as that of the second value, the video information generator generates first video information; When the second value of the current frame in the continuous frames is the same as the first value of the previous frame in the continuous frames having the same position as that of the second value, the video information generator generates second video information. The over drive circuit generates a first target value which is a value between the first value and the second value according to the first video information, and uses the first target value to replace the second value of the current frame; or the over drive circuit generates a second target value according to the second video information, and uses the second target value to replace the second value of the current frame.

Moreover, the device using an overdrive function to do smoothing processing of video data of the present invention may need to further determine which frame is changed or repeated in the frame AABBB and assign a preset processing method, a preset look-up table, a preset gain and a preset parameter to the changed frame according to its order or content information of a frame (such as a frame A or a frame B) in a frame sequence AABBB. In another embodiment, when repeated frames A and A1 in a continuous frames A(A1)B(B1)(B2) are detected, the device may assign a first processing method, a first look-up table, a first gain and a first parameter to the repeated frames; In another embodiment, when repeated frames B and B1 in a continuous frames A(A1)B(B1)(B2) are detected, the device may assign a second processing method, a second look-up table, a second gain and a second parameter to the repeated frames; In another embodiment, when repeated frames B1 and B2 in a continuous frames A(A1)B(B1)(B2) are detected, the device may assign a third processing method, a third look-up table, a third gain and a third parameter to the repeated frames . . . etc.

According to another embodiment of the present invention, a method using an overdrive function to do smoothing processing of video data including a frame sequence AABB or AABBB is provided. The method comprises the following steps: detecting a plurality of continuous frames from the video data. Please note that in an embodiment, the method may further detect the order of a received frame in the frame sequence, detect if a received frame is a frame A or a frame B, . . . and/or other information so as to generate the video information info which further includes an order information, content information of a frame (such as frame A or frame B) and/or other information.

When a second value of a current frame in the continuous frames is different from a first value of a previous frame in the continuous frames having the same position as that of the second value, the video information generator generates first video information; when the second value of the current frame in the continuous frames is the same as the first value of the previous frame in the continuous frames having the same position as that of the second value, the video information generator generates second video information; and generating a first target value which is a value between the first value and the second value according to the first video information, and using the first target value to replace the second value of the current frame; or generating a second target value according to the second image information, and using the second target value to replace the second value of the current frame. Moreover, using an overdrive function to do smoothing processing of the video data of the present invention may need to further determine which frame is repeated or changed in the frame AABBB and assign a preset processing method, a preset look-up table, a preset gain and a preset parameter to the changed frame according to its order or content information of a frame (such as a frame A or a frame B) in a frame sequence AABBB.

The device and method using an overdrive function to do smoothing processing of video data according to embodiments of the present invention can achieve the purpose of smoothing video data.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1C shows a schematic diagram illustrating a video information generator according to an embodiment of the invention.

DETAILED DESCRIPTION OF THE INVENTION

In this specification and the appended claims, some specific words are used to describe specific elements. It should be understood by those who are skilled in the art that some hardware manufacturer may use different names to indicate the same element. In this specification and the appended claims, elements are not differentiated by their names but their functions. As used herein and in the claims, the term "comprising" is inclusive or open-ended and does not exclude additional non-cited elements, compositional components, or method steps. Besides, the term "coupling", when used herein and in the claims, refers to any direct or indirect connection means. Thus, if the specification describes a first device is coupled to a second device, it indicates that the first device can be directly connected (via signal connection, including electrical connection, wireless transmission, optical transmission, etc.) to the second device, or be indirectly connected to the second device via another device or connection means.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context.

Figure 1A:
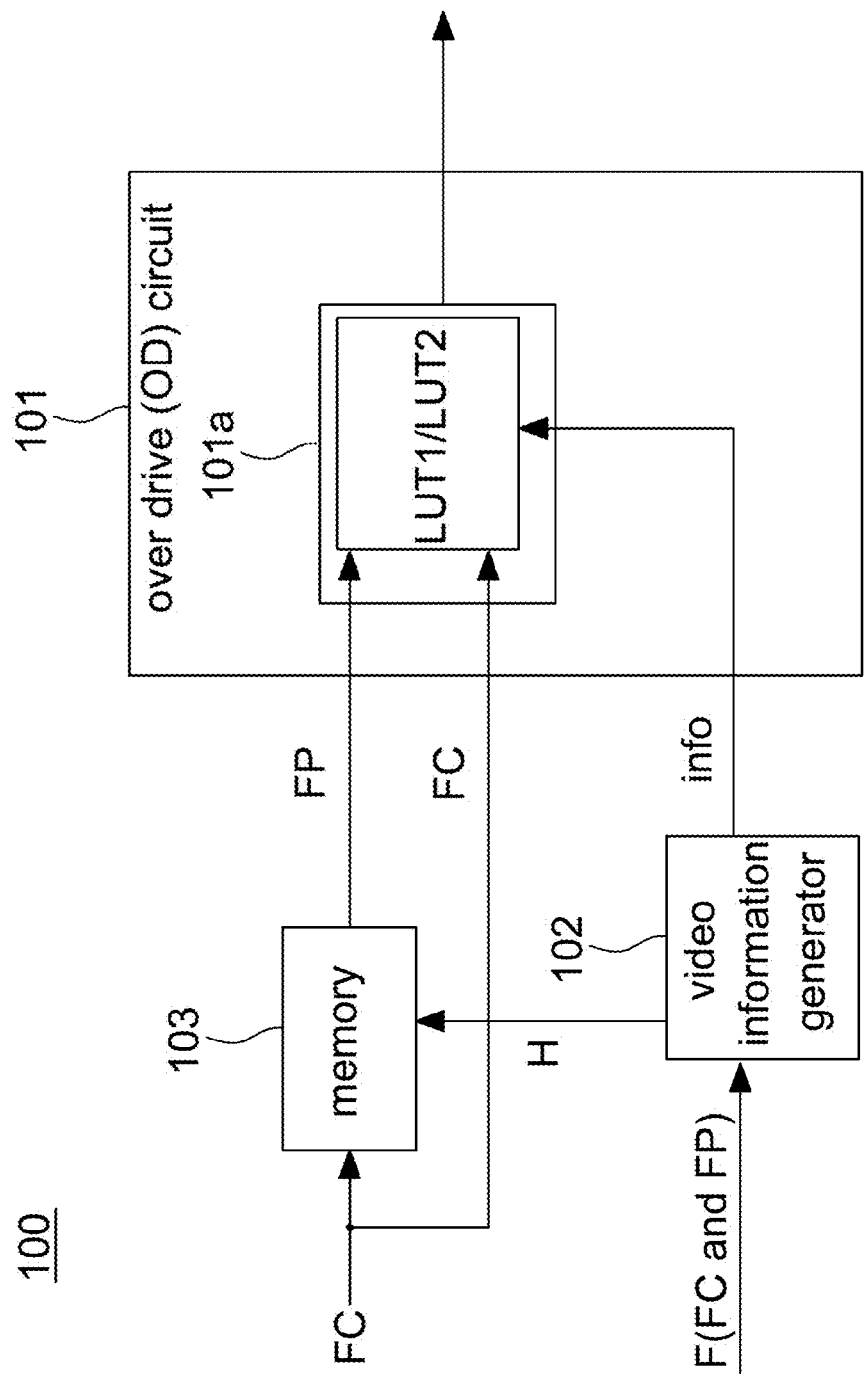
FIG. 1A shows a schematic diagram illustrating a device for doing smoothing processing according to an embodiment of the invention.

FIG. 1A shows a schematic diagram illustrating a device 100 using an overdrive function to do smoothing processing of video data according to an embodiment of the invention. The device 100 includes an over drive (OD) circuit 101, a video information generator 102 and a memory 103. One implementation of the memory 103 may be for example, but not limited to, DMA (direct memory access); another implementation of the memory 103 maybe a DRAM or a SDRAM which is a real component. The following uses a pixel value as a value at a specific position of a frame for illustration but the invention is not limited to this specific example. The value at a specific position of a frame can be 0~255, 0~1023, or any other value and can be set or defined according to a current panel or a panel to be developed in the future.

The over drive circuit 101 includes a processing unit 101a. The processing unit 101a includes two look-up tables LUT1 and LUT2. The first look-up table LUT1 includes a converted value corresponding to a change state of a frame, such as a target value T. The second look-up table LUT2 includes a converted value corresponding to a repeat state of a frame, such as another target value T. The over drive circuit 101 receives a second pixel value P2 (not shown in the figure) of a current frame FC of a video F; through the memory 103, receives a first pixel value P1 (not shown in the figure) of a previous frame FP of the video F corresponding to a specific position of the current frame FC; and uses the processing unit 101a to generate a target value T by processing the first pixel value P1 of the previous frame FP and the second pixel value P2 of the current frame FC with arithmetic processing so as to use the target value T to replace the second pixel value P2.

Figure 1B:
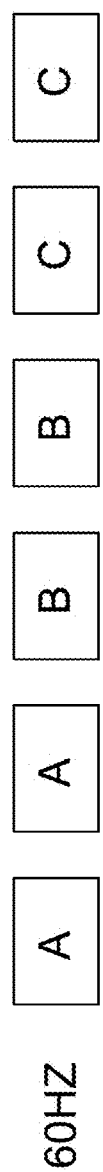
FIG. 1B shows a schematic diagram illustrating a video having repeated frames.
Figure 5:
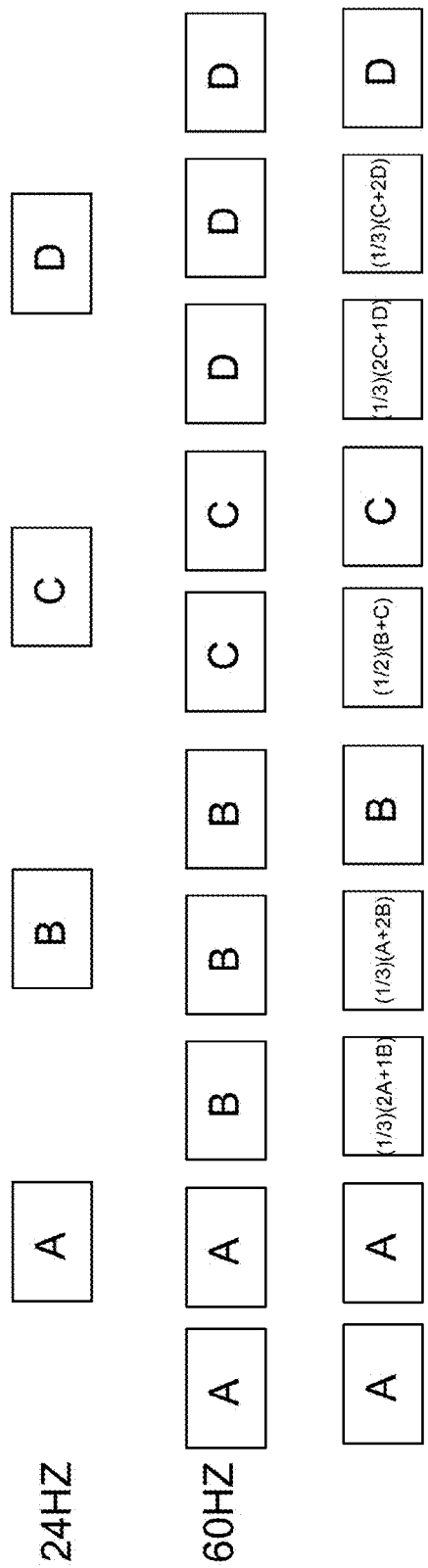
FIG. 5 shows a schematic diagram illustrating a video having repeated frames according to the prior art.

In one embodiment, the video F can be a 60 Hz video having repeated frames AABB converted from a 30 Hz video, as shown in FIG. 1B. In the video F, the same frame is played twice. As shown in the figure, the frame A is repeatedly played once, that is, repeated frames AA; the frame B is repeatedly played once, that is, repeated frames BB; the repeated frames CC; and so forth. Please note that a video having repeated frames received by the device 100 of the present invention for doing smoothing processing is not limited to the above and can be any current video AABBB as shown in FIG. 5 or any video to be developed in the future.

The video information generator 102 receives the video F including the current frame FC and the previous frame FP of the video F; detects the current frame FC and the previous frame FP of the video F; and generates video information info according a repeat state of frames of the video F. The video information info is used to notify the over drive circuit 101 that the frame currently processed needs to use the look-up table LUT1 or LUT2 of the processing unit 101a, that is, to notify the processing unit 101a that the frame currently processed is at a change state like from frame A to B or at a repeat state like from frame B to B. The change state corresponds to the first look-up table LUT1 and the repeat state corresponds to the second look-up table LUT2.

Please note that in an embodiment, the video information generator 102 may further detect the order of a received frame in the frame sequence, detect if a received frame is a frame A or a frame B, . . . and/or other information so as to generate the video information info which further includes an order information, content information of a frame (such as frame A or frame B) and/or other information. To simplify the description of the invention, the below examples omit functions of detecting the order of a received frame in the frame sequence, a content information of a received frame and other information. FIG. 1C shows a schematic diagram illustrating a video information generator 102 according to an embodiment of the invention. The video information generator 102 includes a buffer 102a and a comparator 102b. The buffer 102a receives the current frame FC and temporarily stores the previous frame FP. The comparator 101b compares pixel values of the current frame FC and the previous frame FP at a specific position so as to generate video information info. For example, the second pixel value of a specific position of the current frame FC is P2=200 and the first pixel value of the previous frame FP corresponding to the position of the second pixel value of the current frame FC is P1=100. After the comparator 102a compares the pixel value P1 with the pixel value P2, it is known to be currently a change state of the frames because the pixel values are different and the video information info indicating the change state of the frames is generated. On the contrary, a repeat state of the frame can be derived similarly.

Figure 2:
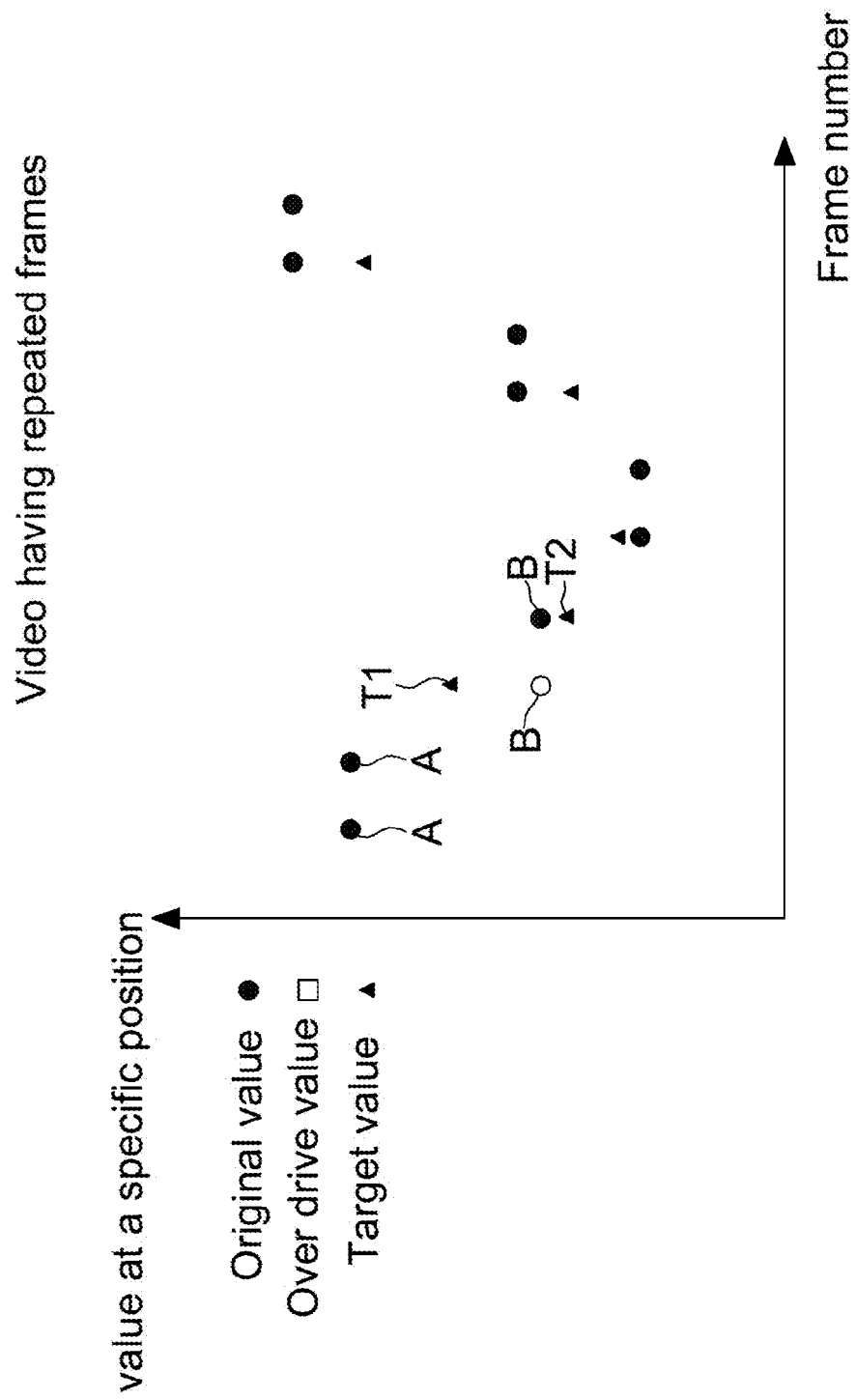
FIG. 2 shows a schematic diagram illustrating over drive processing according to another embodiment of the invention.

Please refer to FIGS. 1A and 2. During operation, it is assumed that in a video F pixel values of a specific position of repeated frames A, A, B, B are 100, 100, 200, 200, respectively. In order to smooth the video, the over drive circuit 101 of the device 100 of the embodiment of the invention receives the current frame FC (for example the first frame B); and receives the previous frame FP (for example the second frame A) via the memory 103. At the same time, the video information generator 102 receives the video F and generates video information info to notify the processing unit 101a of the over drive circuit 101 that the frame is at a change state where the pixel value is changed from 100 to 200. Therefore, the processing unit 101a finds out a corresponding target value T=165 from the first look-up table LUT1 according to a change state of the first pixel value P1=100 of the previous frame FP (the second frame A) and the second pixel value P2=200 of the current frame FC (the first frame B) and uses the target value T=165 to replace the second pixel value 200, as shown by the triangle T1 in FIG. 2. For reaching a purpose of smoothing video data, the over drive circuit 101 may be used to process the first pixel value P1=100 to a middle value=150 (between the first pixel value P1=100 and the second pixel value P2=200). It is a processing method to drive the target value T to be lower than the second pixel value 200.

Then, the over drive circuit 101 receives the current frame FC (the second frame B); and receives the previous frame FP (the first frame B) via the memory 103. At the same time, the video information generator 102 receives the video F and generates video information info to notify the processing unit 101a of the over drive circuit 101 that the frame is at a repeat state where the pixel value 200 is repeated and the video information generator 102 generates a holding signal H to the memory 103 to notify the memory 103 for not overwriting the value of the previous frame FP to keep outputting the pixel value 100 of the second frame A. Therefore, the processing unit 101a finds out a corresponding target value T=205 from the over-driven second look-up table LUT2 according to a repeat state of the first pixel value P1=100 of the previous frame FP (the second frame A) and the second pixel value P2=200 of the current frame FC (the second frame B) and uses the target value T=205 to replace the second pixel value 200, as shown by the triangle T2 in FIG. 2. For reaching a purpose of smoothing video data, the over drive circuit 101 is used to process a middle value=150 (between the first pixel value P1=100 and the second pixel value P2=200) to the second pixel value P2=200. It is a processing method to drive the target value T to be higher than the second pixel value 200. In this way, the device 100 for smoothing processing according to the embodiment of the invention can adjust the pixel values 100, 100, 200, 200 to 100, 100, 165, 205 at a specific position of the frame for repeated frames AABB of the video F so as to obtain a smoother result. It should be noted that the above values are examples only and the invention is not limited to the above example.

Figure 1D:
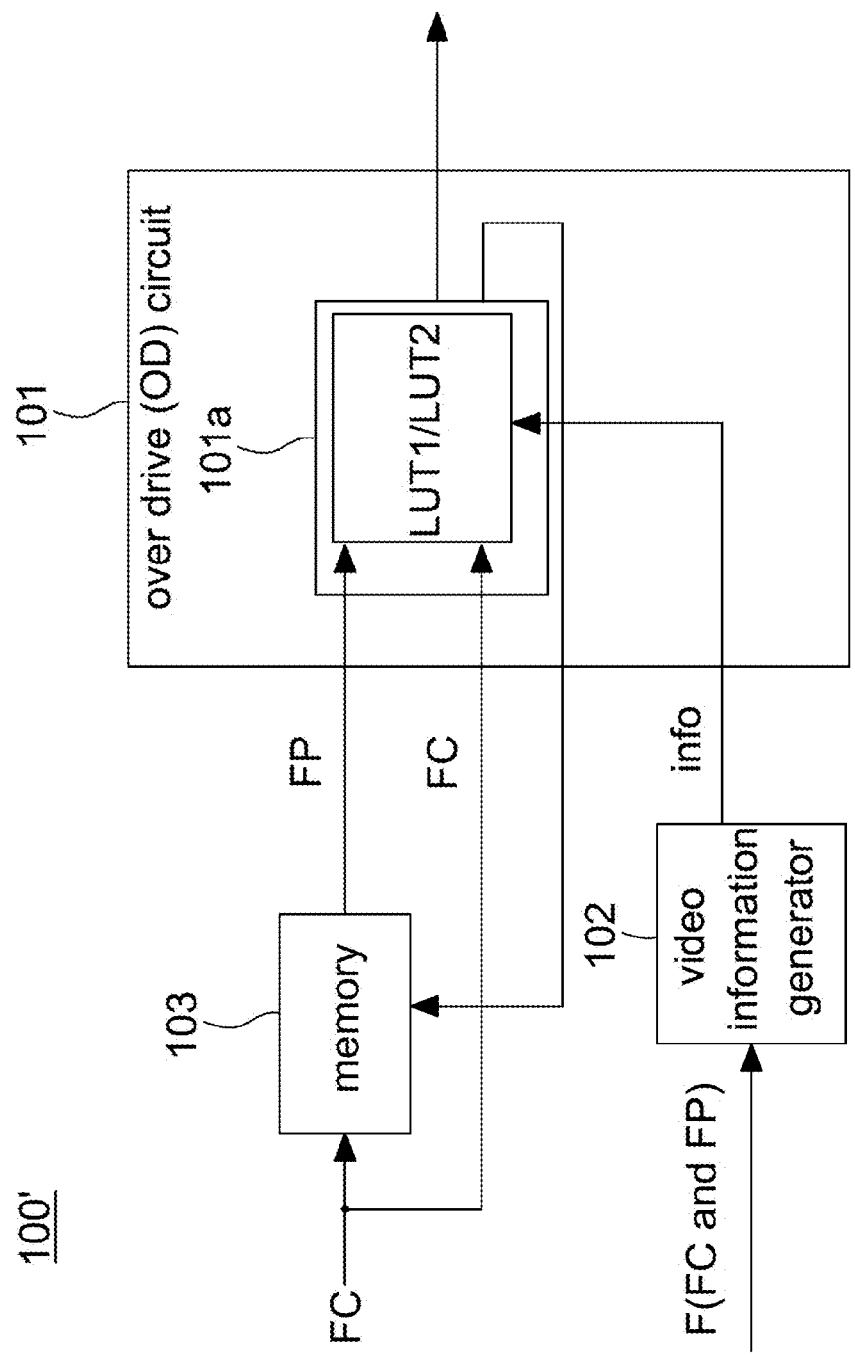
FIG. 1D shows a schematic diagram illustrating a device for doing smoothing processing according to another embodiment of the invention.

FIG. 1D shows a schematic diagram illustrating a device 100' using an overdrive function to do smoothing processing of video data according to another embodiment of the invention. The device 100' includes an over drive (OD) circuit 101, a video information generator 102 and a memory 103. The difference between the device 100' and the device 100 is that the device 100' uses a recursive over drive method to do smoothing processing during the repeat state of the frame.

Please refer to FIGS. 1D and 2. During operation, the over drive circuit 101 receives the current frame FC (for example the first frame B); and receives the previous frame FP (for example the second frame A) via the memory 103. At the same time, the video information generator 102 receives the video F and generates video information info to notify the processing unit 101a of the over drive circuit 101 that the frame is at a change state where the pixel value is changed from 100 to 200. Therefore, the processing unit 101a finds out a corresponding target value T=165 from the first look-up table LUT1 according to a change state of the first pixel value P1=100 of the previous frame FP (the second frame A) and the second pixel value P2=200 of the current frame FC (the first frame B) and uses the target value T=165 to replace the second pixel value 200.

In one embodiment, the over drive circuit 101 receives the current frame FC (the second frame B); and receives the previous frame FP (the first frame B) via the memory 103. At the same time, the video information generator 102 detects the current frame FC and the previous frame FP of the video F and generates video information info to notify the processing unit 101a of the over drive circuit 101 that the frame is at a repeat state where the pixel value 200 is repeated and the processing unit 101a writes the target value T=165 to the memory 103 according to the video information info to output the target value T=165. Therefore, the processing unit 101a finds out a corresponding target value T=205 from the over-driven second look-up table LUT2 according to the outputted target value T=165 and the second pixel value P2=200 of the current frame FC (the second frame B) and uses the target value T=205 to replace the second pixel value 200.

Figure 3A:
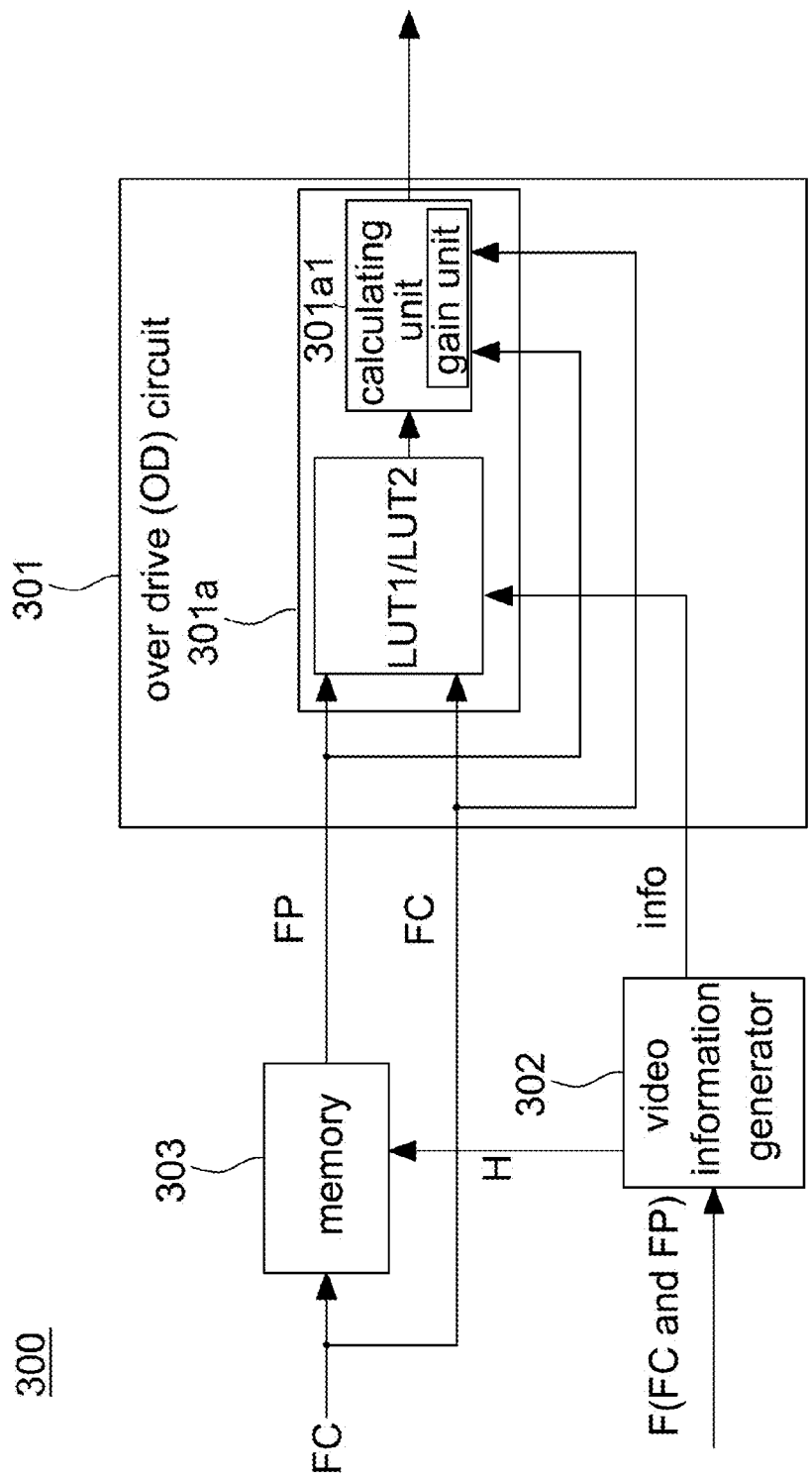
FIG. 3A shows a schematic diagram illustrating a device for doing smoothing processing according to another embodiment of the invention.

FIG. 3A shows a schematic diagram illustrating a device 300 using an overdrive function to do smoothing processing of video data according to another embodiment of the invention. The device 300 includes an over drive circuit 301, a video information generator 302 and a memory 303. The over drive circuit 301 includes a processing unit 301a. The processing unit 301a includes two look-up tables LUT1, LUT2 and a calculating unit 301a1. The calculating unit 301a1 includes a gain unit. It should be noted that the difference between the device 300 and the device 100 is that the look-up tables LUT1 and LUT2 are not used to generate a target value but used to generate a variable X; the look-up table LUT1 is an look-up table to provide a variable X1 when the input frame is at a change state; and the look-up table LUT2 is a look-up table to provide a variable X2 when the input frame is at a repeat state.

During operation, it is assumed that in a video F pixel values of a specific position of repeated frames A, A, B, B are 100, 100, 200, 200, respectively. In order to smooth the video, the over drive circuit 301 of the device 300 of the embodiment of the invention receives the current frame FC (for example the first frame B); and receives the previous frame FP (for example the second frame A) via the memory 103. At the same time, the video information generator 302 receives the video F including the current frame FC and the previous frame FP of the video F, and generates video information info to notify the processing unit 301a of the over drive circuit 301 that the frame is at a change state where the pixel value is changed from 100 to 200. Therefore, the processing unit 301a finds out a corresponding variable X1=0.65 from the first look-up table LUT1 according to a change state of the first pixel value P1=100 of the previous frame FP (the second frame A) and the second pixel value P2=200 of the current frame FC (the first frame B). Then, the calculating unit 301a1 subtracts the first pixel value P1 of the previous frame FP (the second frame A) from the second pixel value P2 of the current frame FC (the first frame B), then multiplies the variable X1, multiplies a gain Gain provided by the gain unit, and adds up with the first pixel value P1, that is FP+(FC−FP)*factor*Gain (100+(200−100) *0.65*1=165), assuming X1(factor)=0.65 and Gain=1), to obtain a target value T=165 to replace the second pixel value 200, as shown by the triangle T1 in FIG. 2. At the time, it is a processing method to drive the target value T to be lower than the second pixel value 200.

Then, the over drive circuit 301 receives the current frame FC (the second frame B); and receives the previous frame FP (the first frame B) via the memory 303. At the same time, the video information generator 302 receives the video F including the current frame FC and the previous frame FP of the video F, and generates video information info to notify the processing unit 301a of the over drive circuit 301 that the frame is at a repeat state where the pixel value 200 is repeated and the video information generator 302 generates a holding signal H to the memory 303 to notify the memory 303 for not overwriting the value of the previous frame FP to keep outputting the pixel value 100 of the second frame A. Therefore, the processing unit 301a finds out a corresponding variable X2=1.05 from the second look-up table LUT2 according to a repeat state of the first pixel value P1=100 of the previous frame FP (the second frame A) and the second pixel value P2=200 of the current frame FC (the second frame B). Then, the calculating unit 301a1 subtracts the first pixel value P1 of the previous frame FP (the second frame A) from the second pixel value P2 of the current frame FC (the second frame B), then multiplies the variable X2, multiplies a gain Gain provided by the gain unit and adds up with the first pixel value P1, that is FP+(FC−FP) *factor*Gain (100+(200−100)*1.05*Gain=205, assuming X2(factor)=1.05 and Gain=1), to obtain a target value T=205 to replace the second pixel value 200, as shown by the triangle T2 in FIG. 2. At the time, it is a processing method to over-drive the target value T to be higher than the second pixel value 200, also called "over drive processing".

In this way, the device 300 for smoothing processing according to the embodiment of the invention can adjust the pixel values 100, 100, 200, 200 to 100, 100, 165, 205 at a specific position of the frame for repeated frames AABB of the video F so as to obtain a smoother result.

Figure 3B:
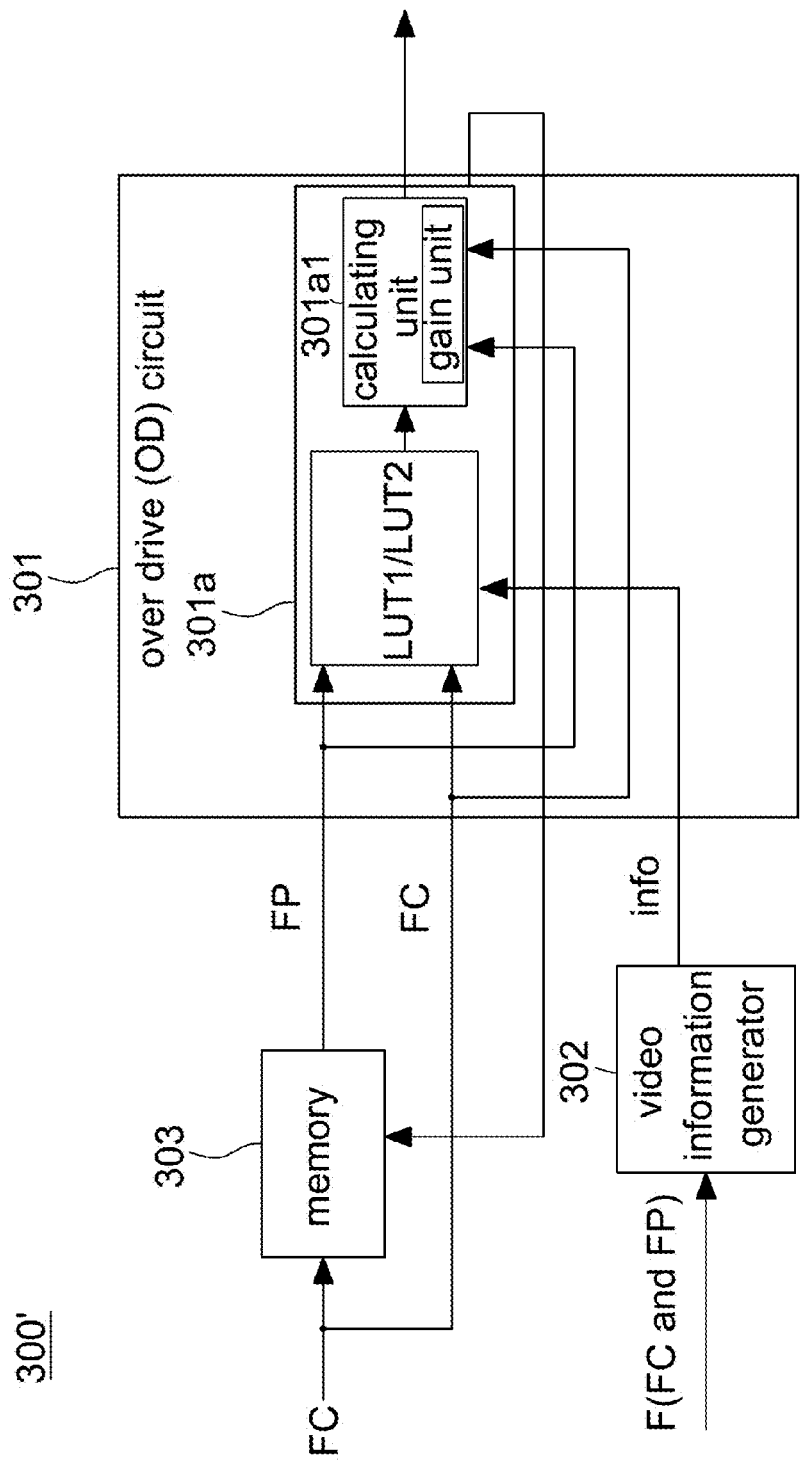
FIG. 3B shows a schematic diagram illustrating a device for doing smoothing processing according to another embodiment of the invention.

FIG. 3B shows a schematic diagram illustrating a device 300' using an overdrive function to do smoothing processing of video data according to another embodiment of the invention. The device 300' includes an over drive circuit 301, a video information generator 302 and a memory 303. The over drive circuit 301 includes a processing unit 301a. The processing unit 301a includes two look-up tables LUT1, LUT2 and a calculating unit 301a1. The calculating unit 301a1 includes a gain unit. It should be noted that the difference between the device 300' and the device 300 is that the device 300' uses a recursive over drive method to do smoothing processing during the repeat state of the frame, that is, when the frame is at a repeat state, the processing unit 301a writes the first target value T to the memory 303 to output the first target value T to the processing unit 301a. Its operational details can be derived from the recursive over drive method shown in FIG. 1D by one having ordinary skill in the art and thus will not be given hereinafter.

It should be noted that this embodiment can adjust the value of the gain whenever needed without adjusting values of the look-up tables one by one and thus setting can be done only once. It should be noted that the above values are only examples and the invention is not limited to the above values.

Figure 4:
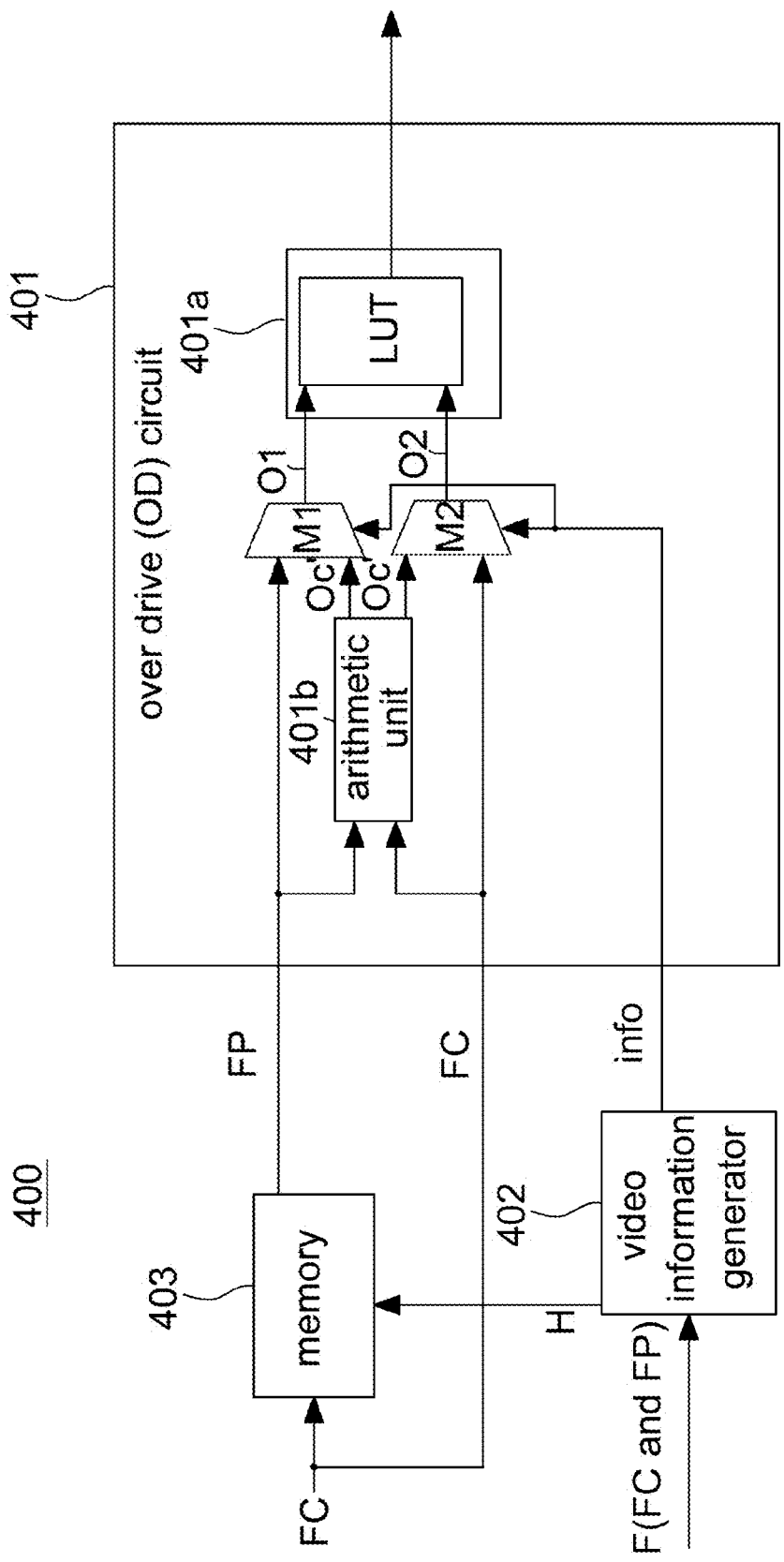
FIG. 4 shows a schematic diagram illustrating a device for doing smoothing processing according to another embodiment of the invention.

FIG. 4 shows a schematic diagram illustrating a device 400 using an overdrive function to do smoothing processing of video data according to another embodiment of the invention. The device 400 includes an over drive circuit 401, a video information generator 402 and a memory 403. The over drive circuit 401 includes a processing unit 401a, an arithmetic unit 401b, a first multiplexer M1 and a second multiplexer M2. The arithmetic unit 401a includes a look-up table LUT to generate a target value T. Noticeably, the difference between the device 400 and the previous device to do smoothing processing is that the arithmetic unit 401b receives the current frame FC; and receives the previous frame FP through the memory 403. After the arithmetic unit 401b processes the pixel values of a specific position of the two frames FC and FP, the arithmetic unit 401b generates an arithmetic value Oc' and outputs to the first multiplexer M1 and the second multiplexer M2. The first multiplexer M1 receives the first pixel value P1 of the previous frame FP and the arithmetic value Oc' as a search starting point of the look-up table LUT of the processing unit 401a. The second multiplexer receives the arithmetic value Oc' and the second pixel value P2 of the current frame FC as a search end point of the look-up table LUT of the processing unit 401a.

In one embodiment, when the video information generator 402 detects a video having repeated frames and the frame is at the above change state, the video information generator 402 generates video information info, for example, as logic value 1 to have the first multiplexer M1 select the first pixel value P1 of the previous frame FP to be outputted from the first output terminal O1 as a search starting point of the look-up table LUT of the processing unit 401a; and at the same time have the second multiplexer M2 select the arithmetic value Oc' to be outputted from the second output terminal O2 as a search end point of the look-up table LUT of the processing unit 401a. Then, the look-up table LUT of the processing unit 401a does conversion to generate a target value T according to the search starting point P1 and the search end point Oc'.

In contrast, when the video information generator 402 detects a video having repeated frames and the frame is at the above repeat state, the video information generator 402 generates a holding signal H to the memory 403 for not overwriting the first pixel value P1 of the previous frame (the second frame A) and the generates video information info, for example, as logic value 0 to have the first multiplexer M1 select the arithmetic value Oc' to be outputted from the first output terminal O1 as a search starting point of the look-up table LUT of the processing unit 401a; and at the same time have the second multiplexer M2 select the second pixel value P2 of the current frame FC to be outputted from the second output terminal O2 as a search end point of the look-up table LUT of the processing unit 401a. Then, the look-up table LUT of the processing unit 401a does conversion to generate an over-drive target value T according to the search starting point Oc' and the search end point P2.

For example, during operation, it is assumed that in a video F pixel values of a specific position of repeated frames A, A, B, B are 100, 100, 200, 200, respectively. In order to smooth the video, the arithmetic unit 401*b* of the over drive circuit 401 of the device 400 to do smoothing processing according to the embodiment of the invention receives the second pixel value P2=200 of the current frame FC (for example the first frame B); and, via the memory 403, receives the first pixel value P1=100 of the previous frame FP (for example the second frame A). The arithmetic unit 401*b* processes the two pixel values P1 and P2. For example, blending processing of P1 and P2, that is, (FP+FC)/2 is performed to generate the arithmetic value Oc'=(100+200)/2=150. At the same time, the video information generator 402 receives the video F including the current frame FC and the previous frame FP of the video F, and generates video information info, for example, as logic value 1, indicating that the frame is at a change state where the pixel value is changed from 100 to 200, to control the first multiplexer M1 to select the pixel value P1=100 and the second multiplexer M2 to select the arithmetic value Oc'=150. Then, the processing unit 401*a* finds out a corresponding target value T=165 from the look-up table LUT according to the search starting point 100 and the search end point 150. The target value T=165 is used to replace the second pixel value P2=200, as shown by the triangle T1 in FIG. 2.

Then, when the video information generator 402 detects the frame at a repeat state where the first pixel value 200 of the previous frame FP (the first frame B) and the second pixel value 200 of the current frame FC (the second frame B) are repeated, the video information generator 402 generates a holding signal H to the memory 403 to control the memory 403 not to overwrite the first pixel value 100 of the previous frame FP (the second frame A). At the time, the arithmetic unit 401*b* processes the pixel values 100 and 200 of the frames FP and FC, respectively, for example to blend two values to generate an arithmetic value Oc'=150. Then, the video information generator 402 generates video information info, for example, as logic value 0 to control the first multiplexer M1 of the over drive circuit 401 to select the arithmetic value Oc'=150 and control the second multiplexer M2 to select the second pixel value P2=200. Therefore, the processing unit 401*a* finds out an target value T=205 from the look-up table LUT according to the search starting point 150 and the search end point 200 and uses the target value T=205 to replace the second pixel value 200, as shown by the triangle T2 in FIG. 2. At the time, it is a processing method to drive the target value T to be higher than the second pixel value 200. Noticeably, the device 400 using an overdrive function to do smoothing processing of video data according to the embodiment of the invention can also use a recursive over drive method to do smoothing processing during the repeat state of the frame, that is, the processing unit 401*a* provides a holding signal H to control the memory 403 not to overwrite the previous frame FP. Its operational details can be derived from the recursive over drive method shown in FIG. 1D by one having ordinary skill in the art and thus will not be given hereinafter.

Besides, in another embodiment, the processing unit 401*a* includes two look-up tables to have conversion with more precise setting. The details can be understood from the above description for those who have ordinary skill in the art and thus will not be given hereinafter.

In the above embodiment, the processing method of the arithmetic unit 401*b* is a de-juddering method for a video to blend the previous frame with the current frame of the video, that is, adding up two values and dividing by 2. Certainly, the invention is not limited to such a method and can use any current available method or any method to be developed in the future.

In an embodiment, the over drive circuit of the invention can further include a switch to stop over-drive compensation when the movement of the video is large and only to use the arithmetic unit for processing, such as blending processing. It should be noted that the large movement of the video is only used as one example. In another embodiment, when the video is determined to be unsuitable for the smoothing processing of the invention, such processing is skipped and the smoothing function of the over drive circuit is cut off to keep only the over drive function of the conventional over drive circuit.

The embodiments of the invention is not only applied to 30~60 Hz repeated frames AABB and another embodiment can be applied to 24~60 Hz repeated frames AABBB, as shown in FIG. 5. When the device 500 to do smoothing processing according to the invention can be applied to a video having repeated frames AABBB, in one embodiment three look-up tables LUT can be used for processing. Moreover, the device using an overdrive function to do smoothing processing of video data of the present invention may need to further determine which frame is changed or repeated in the frame AABBB and assign a preset processing method, a preset look-up table, a preset gain and a preset parameter to the changed frame according to its order or content information of a frame (such as a frame A or a frame B) in a frame sequence AABBB.

Figure 7A:
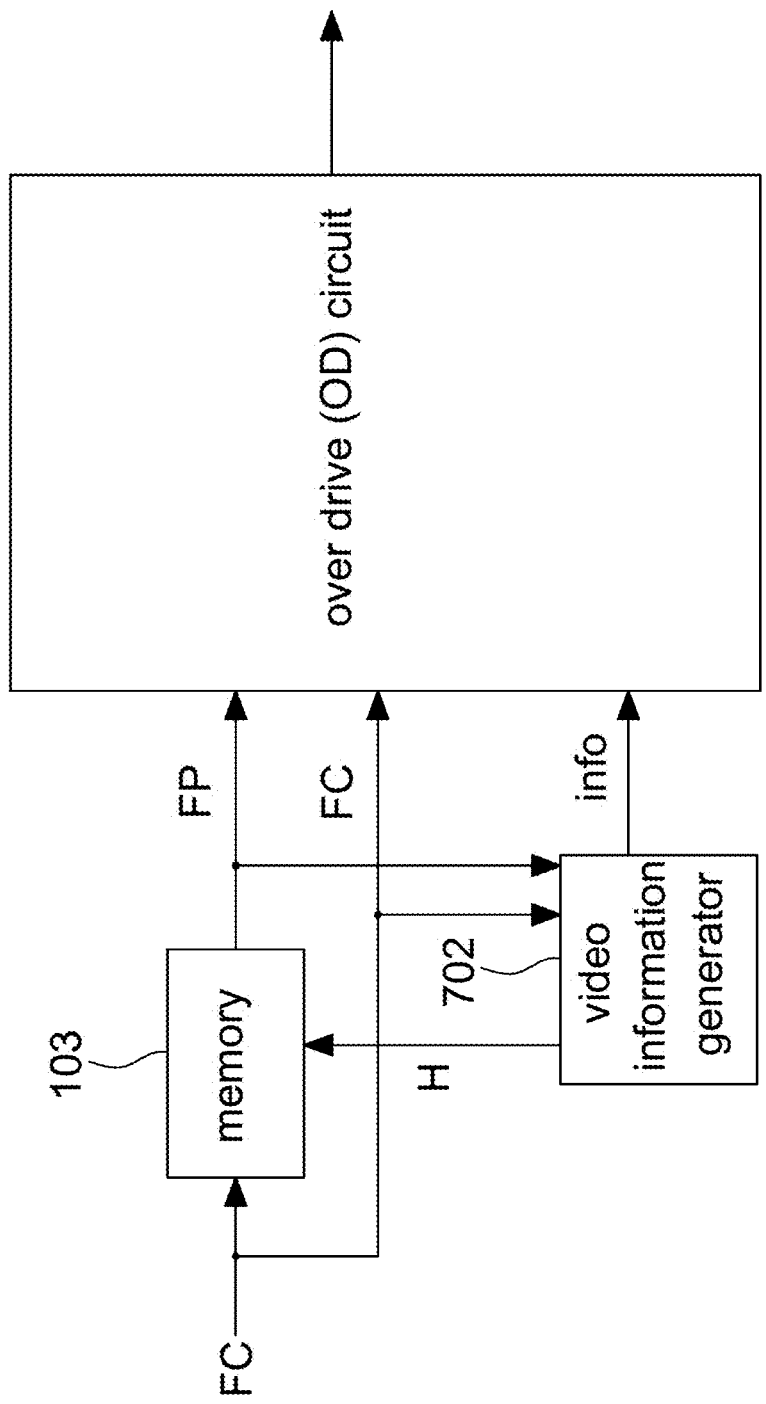
FIGS. 7A and 7B show a schematic diagram in which the video information generator includes a comparator instead of a buffer.
Figure 7B:
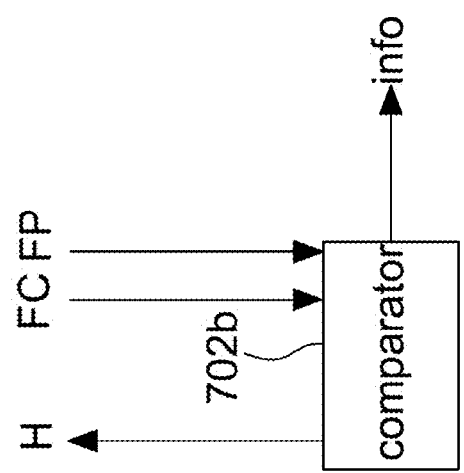

Please note that the buffer 102*a* of the video information generator for storing a frame of video F in FIG. 1C can be omitted and uses memory 103 to instead the function of the buffer 102*a*. For example, as shown in FIGS. 7A and 7B, the video information generator 702 only includes a comparator 702*b*. The comparator 702*b* receives the previous frame FP and the current frame FC from memory 103. Further a buffer of the video information generator 302 (402) (not shown) in FIGS. 3A, 3B and 4 may also be omitted and operates the same as that of in FIG. 7B.

One processing method, blending, is for example shown in the figure. One having ordinary skill in the art can understand how to apply to over drive smoothing technique from the figure and the above description. Its details will not be given hereinafter. Certainly, it is applicable to any current repeated frames or any to be developed in the future.

Figure 6:
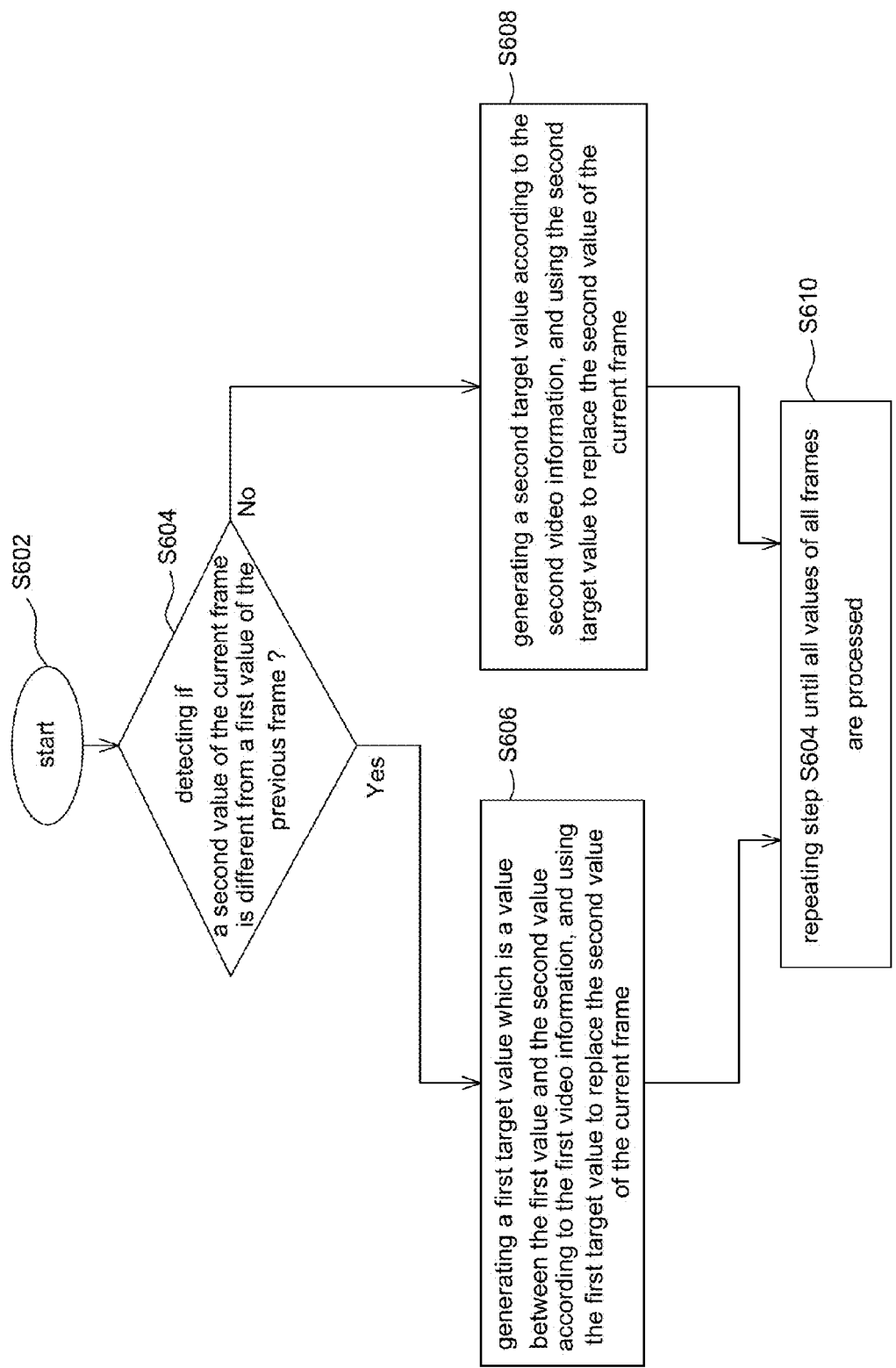
FIG. 6 shows a flow chart of a method for doing smoothing processing.

FIG. 6 shows a flow chart of a method using an overdrive function to do smoothing processing of video data according to one embodiment of the invention. The method includes the following steps:

Step S602: start; receiving a plurality of continuous frames which includes repeated frames, for example a frame sequence as AABB or AABBB;

Step S604: detecting a plurality of continuous frames wherein the continuous frames include a current frame and a previous frame; when a second value of the current frame is different from a first value of the previous frame having the same position as that of the second value, the video information generator generates first video information and go to step S606; when the second value of the current frame is the same as the first value of the previous frame having the same position as that of the second value, the video information generator generates second video information and go to step S608;

Step S606: generating a first target value which is a value between the first value and the second value according to the first video information, and using the first target value to replace the second value of the current frame and go to step S610;

Step S608: generating a second target value according to the second video information, and using the second target value to replace the first value of the previous frame.

Step S610: repeating step S604 until all values of all frames are processed.

It should be noted that the first frame can be processed according the video information and it is assumed that the first frame is the initial condition.

Noticeably, in another embodiment, if the video F does not have repeated frames (for example 30 Hz, A, B, C, D . . . ), the video information generator can convert the video into a video having repeated frames and output the converted video to the over drive circuit.

On the other hand, the corresponding positions of the continuous frames in the previous frame and the current frame are a position of a pixel at (X1, Y1) of the previous frame and a position of a pixel at (x2, Y2) where X1=X2 and Y1=Y2. The above two values corresponding to a position of the continuous frames are the value of a pixel at (X1, Y1) of the previous frame and the value of a pixel at (x2, Y2) of the current frame. The device for smoothing video data according to one embodiment of the invention utilizes over-drive and arithmetic methods, such as blending processing, to calculate the over drive values of repeated frames to have the over drive values be smoother than the original repeated frames so as to solve the juddering problem of a video having repeated frames in the prior art without redesigning a new chip so as to lower production cost.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A device using an overdrive function to do smoothing processing of video data, comprising:
    a video information generator, detecting a plurality of continuous frames wherein the continuous frames include a current frame and a previous frame; when a second value of the current frame is different from a first value of the previous frame having the same position as that of the second value, the video information generator generates first video information; when the second value of the current frame is the same as the first value of the previous frame having the same position as that of the second value, the video information generator generates second video information; and
    an over drive circuit, generating a first target value which is a value between the first value and the second value according to the first video information, and using the first target value to replace the second value of the current frame; or generating a second target value according to the second video information, and using the second target value to replace the second value of the current frame, wherein the over drive circuit includes a first look-up table and a second look-up table, a change state of two continuous frames is defined as a state where the first value and the second value are different, the first look-up table comprises the first target value of the change state, a repeat state of two continuous frames is defined as a state where the first value and the second value are the same, and the second look-up table comprises the second target value of the repeat state.

2. The device according to claim 1, further comprising: a memory, storing the current frame and the previous frame wherein the video information generator generates a holding signal to control the memory for not overwriting the first value of the previous frame, when generating the second video information.

3. The device according to claim 1, further comprising: a memory, storing the current frame and the previous frame wherein the over drive circuit overwrites the first target value to the memory according to the second video information when the video information generator generates the second video information.

4. The device according to claim 1, wherein the video information generator comprises:
    a buffer, receiving the current frame of two continuous frames and temporarily storing the previous frame of the two continuous frames; and
    a comparator, comparing the second value of the current frame and the first value of the previous frame of the two continuous frames to generate the first video information or the second video information.

5. The device according to claim 1, wherein:
    the first look-up table provides a first variable corresponding to the change state of two continuous frames;
    the second look-up table provides a second variable corresponding to the repeat state of the two continuous frames, and the over drive circuit further comprises a calculating unit for generating the first target value according to the first variable or generating the second target value according to the second variable.

6. The device according to claim 5, wherein the calculating unit comprises a gain unit, providing the calculating unit a gain to adjust magnitude of the first target value and the second target value.

7. The device according to claim 1, wherein the over drive circuit further comprises:
    an arithmetic unit, processing the first value and the second value to generate an arithmetic value;
    a first multiplexer, receiving the first value and the arithmetic value as a search starting point of a look-up table of the over drive circuit;
    a second multiplexer, receiving the arithmetic value and the second value as a search end point of the look-up table of the over drive circuit;
    wherein the first multiplexer and the second multiplexer determine values of the search starting point and the search ending point for output according to the first video information or the second video information and the look-up table converts to the first target value or the second target value according to the search starting point and the search ending point.

8. The device according to claim 7, wherein processing the first value and the second value by the arithmetic unit is to blend the first value and the second value.

9. The device according to claim 1, wherein the first value and the second value are pixel values.

10. A method using an overdrive function to do smoothing processing of video data, comprising:
    detecting a plurality of continuous frames wherein the continuous frames include a current frame and a previous frame; when a second value of the current frame is different from a first value of the previous frame having the same position as that of the second value, the video information generator generates first video information; when the second value of the current frame is the same as the first value of the previous frame having the same position as the second value, the video information generator generates second video information; and generating a first target value which is a value between the first value and the second value according to the first video information, and using the first target value to replace the second value of the current frame by a over drive circuit; or generating a second target value according to the second video information, and using the second target value to replace the second value of the current frame by the over drive circuit, wherein the over drive circuit includes a first look-up table and a second look-up table, a change state of two continuous frames is defined as a state where the first value and the second value are different, the first look-up table comprises the first target value of the change state, a repeat state of two continuous frames is defined as a state where the first value and the second value are the same, and the second look-up table comprises the second target value of the repeat state.

11. The method according to claim 10, wherein the first value and the second value are pixel values.

* * * * *